United States Patent
Mizuno et al.

(10) Patent No.: US 10,790,492 B2
(45) Date of Patent: *Sep. 29, 2020

(54) MICROPOROUS POLYOLEFIN MEMBRANE, SEPARATOR FOR BATTERY, AND PRODUCTION PROCESSES THEREFOR

(71) Applicant: Toray Industries, Inc., Tokyo (JP)

(72) Inventors: Naoki Mizuno, Nasushiobara (JP); Masami Sugata, Nasushiobara (JP)

(73) Assignee: Toray Industries, Inc., Tokyo (JP)

( * ) Notice: Subject to any disclaimer, the term of this patent is extended or adjusted under 35 U.S.C. 154(b) by 155 days.

This patent is subject to a terminal disclaimer.

(21) Appl. No.: 16/096,860

(22) PCT Filed: Mar. 1, 2017

(86) PCT No.: PCT/JP2017/008133
§ 371 (c)(1),
(2) Date: Oct. 26, 2018

(87) PCT Pub. No.: WO2017/187779
PCT Pub. Date: Nov. 2, 2017

(65) Prior Publication Data
US 2019/0140239 A1    May 9, 2019

(30) Foreign Application Priority Data
Apr. 27, 2016  (JP) .................. 2016-089551

(51) Int. Cl.
*H01M 2/16* (2006.01)
*H01M 2/14* (2006.01)
(Continued)

(52) U.S. Cl.
CPC ........... *H01M 2/1653* (2013.01); *B29C 55/14* (2013.01); *B29C 55/143* (2013.01); *B29D 7/01* (2013.01); *C08J 5/2231* (2013.01); *C08J 7/0427* (2020.01); *C08J 9/28* (2013.01); *H01G 11/52* (2013.01); *H01M 2/145* (2013.01); *H01M 2/16* (2013.01); *H01M 2/1686* (2013.01); *B29K 2105/041* (2013.01); *B29L 2007/002* (2013.01);
(Continued)

(58) Field of Classification Search
None
See application file for complete search history.

(56) References Cited

U.S. PATENT DOCUMENTS 5,051,183 A     9/1991  Takita et al.
10,283,749 B2 * 5/2019  Mizuno .................. B32B 27/32
(Continued)

FOREIGN PATENT DOCUMENTS

JP    6-247615 A    9/1994
JP    6-104736 B2  12/1994
(Continued)

*Primary Examiner* — Jonathan Crepeau
(74) *Attorney, Agent, or Firm* — DLA Piper LLP (US)

(57) ABSTRACT

A polyolefin microporous membrane has a variation range of F25 value in a longitudinal direction of 1 MPa or less; a thickness of 3 μm or more and less than 7 μm; and a length of 1,000 m or more (wherein the F25 value is a value obtained by measuring a load value applied to a test specimen when the test specimen is stretched by 25% using a tensile tester; and dividing the load value by a value of a cross-sectional area of a test specimen).

15 Claims, 3 Drawing Sheets

Longitudinal stretching apparatus (1)

(51) Int. Cl.
*B29C 55/14* (2006.01)
*C08J 7/04* (2020.01)
*C08J 9/28* (2006.01)
*H01G 11/52* (2013.01)
*B29D 7/01* (2006.01)
*C08J 5/22* (2006.01)
*B29L 31/34* (2006.01)
*B29K 105/04* (2006.01)
*B29L 7/00* (2006.01)

(52) U.S. Cl.
CPC ... *B29L 2031/3468* (2013.01); *C08J 2323/06* (2013.01); *Y02E 60/13* (2013.01)

(56) References Cited

U.S. PATENT DOCUMENTS

| | | | |
|---|---|---|---|
| 10,486,112 B2 * | 11/2019 | Mizuno | C08F 20/06 |
| 2010/0178544 A1 | 7/2010 | Nishikawa | |
| 2011/0143185 A1 | 6/2011 | Nishikawa | |
| 2012/0015229 A1 * | 1/2012 | Ohashi | H01M 10/0525 |
| | | | 429/144 |
| 2013/0116355 A1 | 5/2013 | Kang et al. | |
| 2014/0077405 A1 | 3/2014 | Funaoka | |
| 2017/0005321 A1 | 1/2017 | Sugata et al. | |
| 2017/0165893 A1 | 6/2017 | Ichinomiya et al. | |

FOREIGN PATENT DOCUMENTS

| | | |
|---|---|---|
| JP | 3347835 B2 | 11/2002 |
| JP | 2007-273443 A | 10/2007 |
| JP | 2008-186721 A | 8/2008 |
| JP | 2009-26733 A | 2/2009 |
| JP | 2009-205955 A | 9/2009 |
| JP | 2010-92882 | 4/2010 |
| JP | 2011-526547 A | 10/2011 |
| JP | 2012-500130 A | 1/2012 |
| JP | 2012-20437 A | 2/2012 |
| JP | 2013-530261 A | 7/2013 |
| JP | 2014-188748 A | 10/2014 |
| JP | 5845381 B1 | 1/2016 |
| KR | 20120121152 A | 5/2012 |
| WO | 2008/149895 A1 | 12/2008 |
| WO | 2012/150618 A1 | 11/2012 |
| WO | 2014/192862 A1 | 12/2014 |
| WO | 2015/146580 A1 | 10/2015 |
| WO | 2015/190487 A1 | 12/2015 |

* cited by examiner

Longitudinal stretching apparatus (1)

Longitudinal stretching apparatus (2)

Longitudinal stretching apparatus (3)

Longitudinal stretching apparatus (4)

An example of re-stretching apparatus

An example of coating apparatus

MICROPOROUS POLYOLEFIN MEMBRANE, SEPARATOR FOR BATTERY, AND PRODUCTION PROCESSES THEREFOR

TECHNICAL FIELD

This disclosure relates to: a polyolefin microporous membrane; a battery separator including the polyolefin microporous membrane and a porous layer provided at least on one surface of the polyolefin microporous membrane; and methods of producing the same.

BACKGROUND

Thermoplastic resin microporous membranes have been widely used as separation membranes, selectively permeable separation membranes and the like, for separating substances. Examples of applications of thermoplastic resin microporous membranes include: battery separators for use in lithium ion secondary batteries, nickel-hydrogen batteries, nickel-cadmium batteries, and polymer batteries; separators for electric double layer capacitors; various types of filters such as reverse osmosis filtration membranes, ultrafiltration membranes, and microfiltration membranes; moisture-permeable waterproof clothing; medical materials and the like.

In particular, microporous membranes made of polyethylene have been suitably used as a lithium ion secondary battery separator since they have ion permeability due to electrolyte impregnation, excellent electrical insulation properties, as well as a pore blocking function capable of blocking current at a temperature of about 120 to 150° C. when the internal temperature of a battery is increased to an abnormally high level, and thereby preventing an excessive temperature increase. However, when the temperature increase in the battery persists even after pores in the membrane are blocked, for some reason, membrane rupture may occur as a result of the shrinkage of the polyethylene microporous membrane. This phenomenon is not limited to microporous membranes made of polyethylene, and inevitably occurs in microporous membranes made of other thermoplastic resins, at a temperature equal to or higher than the melting point of the resin constituting the membrane.

Lithium ion battery separators are deeply involved in battery characteristics, battery productivity and battery safety, and are required to have heat resistance, electrode adhesion, permeability, melt rupture properties (meltdown properties), and the like. So far, it has been investigated to impart heat resistance or adhesive properties to a battery separator, for example, by providing a porous layer on a microporous membrane made of polyolefin. As the resin to be used in the porous layer, a resin having a heat resistance such as a polyamideimide resin, a polyimide resin or a polyamide resin, or a resin having adhesive properties such as a fluororesin, has been suitably used. In recent years, a water-soluble or water-dispersible binder has also been used, which allows for lamination of a porous layer with a relatively simple process.

The porous layer as used herein refers to a layer obtained by a wet coating method.

Example 5 in JP 2007-273443 A discloses a technique in which an aqueous solution prepared by uniformly dispersing titania particles and polyvinyl alcohol is coated on a polyethylene microporous membrane obtained by a simultaneous biaxial stretching method and having a thickness of 20 μm using a gravure coater, and the resultant is then dried at 60° C. to remove water, to obtain a multilayer porous membrane having a total film thickness of 24 μm (coating thickness: 4 μm).

Example 3 in JP 2008-186721 A discloses a technique in which an aqueous solution prepared by uniformly dispersing titania particles and polyvinyl alcohol is coated on a polyolefin microporous membrane obtained by a simultaneous biaxial stretching method and having a thickness of 16 μm, using a bar coater, and the resultant is then dried at 60° C. to remove water, to obtain a multilayer porous membrane having a total film thickness of 19 μm (coating thickness: 3 μm).

Example 1 in JP 2009-026733 A discloses a technique in which an aqueous solution prepared by uniformly dispersing aluminum particles and polyvinyl alcohol is coated on a polyolefin microporous membrane obtained by a simultaneous biaxial stretching method and having a thickness of 16 μm, using a gravure coater, and the resultant is then dried at 60° C. to remove water, to obtain a multilayer porous membrane having a total film thickness of 20 μm (coating thickness: 4 μm).

Example 6 in WO 2008/149895 A1 discloses a technique in which a polyethylene microporous membrane obtained by a sequential biaxial stretching method and having a thickness of 11 to 18 μm is passed between Meyer bars on the surface(s) of which an adequate amount of a coating liquid containing a meta-type wholly aromatic polyamide, alumina particles, dimethylacetamide (DMAc) and tripropylene glycol (TPG) is applied, and the resultant is then subjected to solidification, water-washing and drying steps, to obtain a nonaqueous secondary battery separator including a heat resistant porous layer(s) formed on the microporous membrane.

JP 2010-092882 A discloses a technique in which a polyethylene microporous membrane obtained by a sequential biaxial stretching method and having a thickness of 10 to 12 μm is passed between opposed Meyer bars on the surface(s) of which an adequate amount of a coating liquid composed of a meta-type wholly aromatic polyamide, aluminum hydroxide, DMAc and TPG is applied, and the resultant is then subjected to solidification, water-washing and drying steps, to obtain a nonaqueous secondary battery separator including a heat resistant porous layer(s) formed on the microporous membrane.

JP 2009-205955 A discloses a technique in which a polyethylene microporous membrane obtained by a sequential biaxial stretching method and having a thickness of 12 μm is passed between opposed Meyer bars on the surface(s) of which an adequate amount of a coating liquid composed of polymetaphenylene isophthalamide, aluminum hydroxide, DMAc and TPG is applied, and the resultant is then subjected to solidification, water-washing and drying steps, to obtain a nonaqueous secondary battery separator including a heat resistant porous layer(s) formed on the microporous membrane.

JP 2012-020437 A discloses a technique in which a laminated porous film is obtained by a combination of a so-called sequential biaxial stretching method and an in-line coating method. Specifically, a non-porous membrane-like product having a three-layer structure and including as an outer layer a layer containing polypropylene containing a β-crystal nucleating agent, is stretched in the longitudinal direction using a longitudinal stretching apparatus; then an aqueous dispersion containing alumina particles and polyvinyl alcohol is coated on the stretched product, using a Meyer bar; and, subsequently, the resultant is stretched 2-fold in the transverse direction, followed by thermal fixation/relaxation treatments; to obtain the laminated porous film.

JP 2013-530261 A exemplifies a separation membrane obtained by a sequential biaxial stretching method using a longitudinal stretching machine including four stretching rolls, wherein the stretching rolls are configured such that an object to be stretched comes into contact with the stretching rolls at an angle equal to or greater than a predetermined angle.

In recent years, lithium ion secondary batteries have been widely investigated to be used in electric cars, hybrid cars and electric motorcycles, as well as lawn mowers, grass mowers and small marine vessels. With growing popularity in such applications, an increase in the capacity of lithium ion secondary batteries and a reduction in cost are demanded at the same time. Therefore, it is expected that a demand for long-length battery separators having a length of 1,000 m or more will increase more than ever to achieve a reduction in the production cost. An increase in the length of a battery separator reduces the time required to replace battery separator rolls during a slitting step or a battery assembly step and, accordingly, it is possible to obtain a battery separator that reduces waste of materials.

When a porous layer is formed by wet coating on a polyolefin microporous membrane having a long length to produce a battery separator, and if the porous layer has a large thickness variation range in the longitudinal direction, the porous layer needs to have an average thickness 1.5 times to 2 times the minimum required thickness to sufficiently secure the functions of the porous layer, becoming a factor for an increased cost. Further, an increase in the thickness of the battery separator leads to a decrease in the number of winding of the resulting electrode roll, and it may be a factor in hindering an increase in the capacity of the resulting battery.

Moreover, an increased length of the battery separator results in an increased number of winding and, thus, in an increased diameter, of the resulting battery separator roll. This in turn adversely affects the winding appearance of the battery separator roll, that is, for example, the roll may be more susceptible to winding displacement. Such a tendency is expected to be pronounced in a separator having a reduced thickness because the number of winding of the resulting battery separator roll is further increased.

It could therefore be helpful to provide a polyolefin microporous membrane suitable for providing thereon a porous layer having a uniform thickness, and having: a variation range of F25 value in the longitudinal direction of 1 MPa or less; a thickness of 3 μm or more and less than 7 μm; and a length of 1,000 m or more. Further, it could be helpful to provide a battery separator including: the polyolefin microporous membrane; and a porous layer formed on the polyolefin microporous membrane and having a uniform thickness; and which is suitable for increasing the capacity of a battery. The expression that the porous layer has a uniform thickness, as used herein, means that that the porous layer has a thickness variation range (R) in the longitudinal direction of 1.0 μm or less.

SUMMARY

We thus provide:
(1) The polyolefin microporous membrane is a polyolefin microporous membrane having: a variation range of F25 value in the longitudinal direction of 1 MPa or less; a thickness of 3 μm or more and less than 7 μm; and a length of 1,000 m or more (wherein the F25 value refers to a value obtained by: measuring a load value applied to a test specimen when the test specimen is stretched by 25% using a tensile tester; and dividing the load value by the value of the cross-sectional area of the test specimen).

(2) The battery separator is a battery separator including:
the polyolefin microporous membrane according to (1); and
a porous layer which is formed on at least one surface of the polyolefin microporous membrane, which contains at least one resin selected from the group consisting of fluorine resins, acrylic resins, polyvinyl alcohol resins and carboxymethyl cellulose resins, and particles, and which has an average thickness $T_{(ave)}$ of 1 to 5 μm.

(3) In the battery separator, the porous layer preferably has a thickness variation range (R) in the longitudinal direction of 1.0 μm or less.

(4) The polyolefin microporous membrane preferably has a length of 2,000 m or more.

(5) The polyolefin microporous membrane preferably has a length of 3,000 m or more.

Further, the method of producing the polyolefin microporous membrane is as follows:

(6) The method of producing the polyolefin microporous membrane is a method of producing the polyolefin microporous membrane, the method including the steps of:
(a) melt blending a polyolefin resin and a forming solvent to prepare a polyolefin resin solution;
(b) extruding the polyolefin resin solution in the form of a sheet, by an extruder, and cooling the resultant to form an unstretched gel-like sheet;
(c) allowing the unstretched gel-like sheet to pass through at least three sets of longitudinal stretching rolls to be stretched in the longitudinal direction based on the peripheral speeds of the stretching rolls, which peripheral speeds are set at progressively higher rates in the direction in which the sheet passes, to obtain a longitudinally stretched gel-like sheet (wherein one longitudinal stretching roll, and one or more nip rolls coated with a heat resistant rubber and in contact with the longitudinal stretching roll in parallel, are defined as one set of longitudinal stretching rolls, wherein the nip roll(s) come(s) into contact with the longitudinal stretching roll at a pressure of 0.05 MPa or more and 0.5 MPa or less);
(d) stretching the longitudinally stretched gel-like sheet in the transverse direction, with the sheet held such that a clip-to-clip distance at a tenter exit is 50 mm or less, to obtain a biaxially stretched gel-like sheet;
(e) extracting the forming solvent from the biaxially stretched gel-like sheet, followed by drying; and
(f) subjecting the dried sheet to a heat treatment, to obtain the polyolefin microporous membrane.

(7) In the method of producing the polyolefin microporous membrane, the peripheral speed ratios between respective adjacent longitudinal stretching rolls, in the step (c), are preferably set at progressively higher rates in the direction in which the sheet passes.

(8) The method of producing a roll of a polyolefin microporous membrane is a method including the step of winding the polyolefin microporous membrane obtained by the method of producing the polyolefin microporous membrane, according to the above described (6) or (7), at a transport rate of 50 m/min or more.

(9) The method of producing a battery separator is a method including the step of coating a coating liquid containing at least one resin selected from the group consisting of fluorine resins, acrylic resins, polyvinyl alcohol resins and cellulose ether resins, and particles, on at least one surface of the polyolefin microporous membrane obtained by the method of producing the polyolefin microporous membrane, according to the above described (6) or (7), by a roll coating method using a coating roll having a deflection accuracy of equal to or less than 10 μm/Φ100 mm, followed by drying.
(10) In the method of producing a battery separator, the coating roll is preferably a gravure roll.

It is thus possible to obtain a polyolefin microporous membrane suitable for providing thereon a porous layer having a uniform thickness, and which has a thickness of 3 μm or more and less than 7 μm, and a length of 1,000 m or more. Further, it is possible to obtain a battery separator including: the polyolefin microporous membrane; and a porous layer formed on the polyolefin microporous membrane and having a uniform thickness; and suitable for increasing the capacity of a battery.

DESCRIPTION OF SYMBOLS

Figure 1:
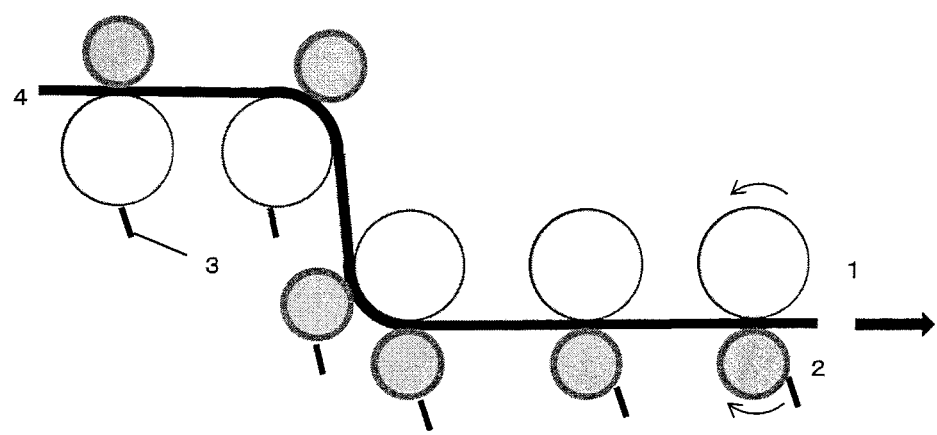
FIG. 1 is a schematic diagram showing a longitudinal stretching apparatus (1) which is used for sequential biaxial stretching.

1. Longitudinal stretching roll
2. Nip roll
3. Blade
4. Unstretched gel-like sheet
5. Biaxial stretching sheet
6. Longitudinal re-stretching roll
7. Nip roll for longitudinal re-stretching
8. Polyolefin microporous membrane
9. Coating roll
10. Coating tangential line
11. Back roll
12. Roll position adjusting direction

DETAILED DESCRIPTION

The polyolefin microporous membrane has: a variation range of F25 value in the longitudinal direction of 1 MPa or less; a thickness of 3 μm or more and less than 7 μm; and a length of 1,000 m or more (wherein the F25 value refers to a value obtained by: measuring a load value applied to a test specimen when the test specimen is stretched by 25% using a tensile tester; and dividing the load value by the value of the cross-sectional area of the test specimen).

When the variation range of the F25 value in the longitudinal direction of the polyolefin microporous membrane is adjusted to 1 MPa or less, we provide an excellent effect that the contact pressure at a tangential line (hereinafter, abbreviated as "coating tangential line") between the polyolefin microporous membrane and a coating roll is more likely to be uniform with respect to the longitudinal direction of the polyolefin microporous membrane, thereby facilitating to obtain a uniform coating thickness. If the variation range of the F25 value in the longitudinal direction is greater than 1 MPa, unevenness in winding hardness occurs in a roll of the microporous membrane during the winding of the microporous membrane in a slitting step or a coating step. As a result, deflection or winding displacement is more likely to occur, resulting in a poor winding appearance. The above described phenomenon becomes pronounced, for example, when the microporous membrane is processed at a high speed such as when the membrane is wound about a winding core at a transport rate of 50 m/min or more.

1. Polyolefin Microporous Membrane

First, the polyolefin microporous membrane will be described.

The polyolefin microporous membrane has a variation range of the F25 value in the longitudinal direction of 1 MPa or less. The variation range is preferably 0.8 MPa or less, more preferably 0.6 MPa or less, and still more preferably 0.4 MPa or less. In particular, it is possible to control the variation range of the F25 value in the longitudinal direction of the polyolefin microporous membrane, by controlling the conditions in a longitudinal stretching step and a transverse stretching step at a high level, as will be described below.

Examples of the polyolefin resin to be contained in the polyolefin microporous membrane include: homopolymers, two-step polymers and copolymers, obtained by polymerizing ethylene, propylene, 1-butene, 4-methyl-1-pentene, and/or 1-hexene; and mixtures of these polymers. Any of various types of additives such as antioxidants and inorganic fillers, may be added to the polyolefin resin, to the extent that the desired effects are not impaired.

The polyolefin resin preferably contains a polyethylene resin as a main component, and the content of the polyethylene resin is preferably 70% by mass or more, more preferably 90% by mass or more, and still more preferably 100% by mass, with respect to 100% by mass of the total mass of the polyolefin resin.

Examples of the polyethylene include ultra-high molecular weight polyethylenes, high density polyethylenes, medium density polyethylenes, and low density polyethylenes. The polyethylene may be not only a homopolymer of ethylene, but also a copolymer containing a small amount of α-olefin other than ethylene. Suitable examples of the α-olefin other than ethylene include propylene, 1-butene, 1-pentene, 1-hexene, 4-methyl-1-pentene, 1-octene, (meth) acrylic acid, esters of (meth)acrylic acid, and styrene. The polyethylene may be a simple substance, but is preferably a polyethylene mixture composed of two or more types of polyethylenes. A polymerization catalyst to be used is not particularly limited, and a Ziegler-Natta catalyst, a Phillips catalyst, or a metallocene catalyst can be used.

The polyethylene mixture may be a mixture of: two or more types of ultra-high molecular weight polyethylenes, two or more types of high density polyethylenes, two or more types of medium density polyethylenes, or two or more types of low density polyethylenes, having different weight average molecular weights (Mws). Alternatively, the polyethylene mixture may be a mixture of two or more types of polyethylenes selected from the group consisting of ultra-high molecular weight polyethylenes, high density polyethylenes, medium density polyethylenes and low density polyethylenes. The polyethylene mixture is preferably a mixture composed of an ultra-high molecular weight polyethylene having a weight average molecular weight of $5\times10^5$ or more and a polyethylene having a weight average molecular weight of $1\times10^4$ or more and less than $5\times10^5$. The content of the ultra-high molecular weight polyethylene in the mixture is preferably 1 to 40% by weight, from the viewpoint of improving tensile strength.

The polyethylene preferably has a molecular weight distribution (weight average molecular weight (Mw)/number average molecular weight (Mn)) of 5 to 200, from the viewpoint of improving mechanical strength.

2. Method of Producing Polyolefin Microporous Membrane

Next, the method of producing the polyolefin microporous membrane will be described.

To produce the polyolefin microporous membrane, a dry process (a method (also referred to as stretching pore-forming process) in which a crystal nucleating agent or particles are used to carry out porosification, without using a forming solvent), or a wet process (phase separation process) can be used. The wet process is preferred from the viewpoint of obtaining a microporous membrane having uniform micropores and good flatness.

Examples of the production method using the wet process include a method in which: a polyolefin and a forming solvent are subjected to heating and melt blending; the resulting resin solution is extruded through a die, followed by cooling, to form an unstretched gel-like sheet; and the resulting unstretched gel-like sheet is subjected to stretching at least in one axial direction, followed by removing the forming solvent and drying, to obtain a microporous membrane.

The polyolefin microporous membrane may be a monolayer membrane, or a membrane having a layer structure composed of two or more layers having different molecular weights of the resins, or different average pore diameters. When the polyolefin microporous membrane has a layer structure composed of two or more layers, it is preferred that at least one polyethylene resin contained in its outermost layer have a molecular weight and a molecular weight distribution satisfying the above described ranges.

The polyolefin microporous membrane having a layer structure composed of two or more layers can be produced, for example, either by: a method in which polyolefins constituting Layer a and Layer b are each subjected to heating and melt blending, along with a forming solvent, and the respective resulting resin solutions are supplied from respective extruders to one die, to be integrated and co-extruded; or a method in which respective gel-like sheets constituting respective layers are layered one on another, and fused by heating. The method utilizing co-extrusion is preferred, because: an adhesive strength between layers can be easily obtained; a high permeability can be easily maintained due to being able to easily form communication pores communicating between layers; and an excellent productivity can be obtained.

The method of producing the polyolefin microporous membrane will now be described in detail.

The unstretched gel-like sheet is subjected to stretching in two axial directions, namely, the longitudinal direction (also referred to as "MD" or "machine direction", or "longitudinal direction") and the width direction (also referred to as "TD" or "transverse direction"), to a predetermined magnification, by a roll stretching method, a tenter stretching method, or a combination of these methods. It is possible to use either: a sequential biaxial stretching method in which an unstretched gel-like sheet is longitudinally stretched by a roll stretching method, followed by transversely stretching the resulting sheet within a tenter, with both ends thereof fixed by clips; or a simultaneous biaxial stretching method in which an unstretched gel-like sheet is subjected to longitudinal stretching and transverse stretching, simultaneously, with both ends of the sheet fixed by clips. In particular, the sequential biaxial stretching method is preferred, because it allows for performing transverse stretching while maintaining a short interval between the clips, making the resulting sheet less susceptible to variations in the quality of the sheet in the longitudinal direction and, as a result, an increase in the variation range of the F25 value in the longitudinal direction can be easily prevented.

Examples of the method of producing the polyolefin microporous membrane will be described, with reference to the sequential biaxial stretching method.

The method of producing the polyolefin microporous membrane includes the following steps (a) to (f):

(a) a step of melt blending a polyolefin resin and a forming solvent to prepare a polyolefin resin solution;

(b) a step of extruding the polyolefin resin solution in the form of a sheet, by an extruder, and cooling the resultant to form an unstretched gel-like sheet;

(c) a longitudinal stretching step of stretching the unstretched gel-like sheet in the longitudinal direction to form a longitudinally stretched gel-like sheet;

(d) a step of stretching the longitudinally stretched gel-like sheet in the transverse direction, with the sheet held such that a clip-to-clip distance at a tenter exit is 50 mm or less, to obtain a biaxially stretched gel-like sheet;

(e) a step of removing the forming solvent from the biaxially stretched gel-like sheet, followed by drying; and (f) a step of subjecting the dried sheet to a heat treatment, to obtain the polyolefin microporous membrane.

Further, a corona treatment step or the like can be carried out as necessary, after carrying out the steps (a) to (f).

(a) Step of Preparing Polyolefin Resin Solution

In the step of preparing a polyolefin resin solution, a forming solvent is added to a polyolefin resin, and then the resultant is subjected to melt blending, to prepare a polyolefin resin solution. Examples of the melt blending method include methods using a twin screw extruder disclosed in JP 06-104736 B and JP 3347835 B. The description regarding the melt blending method is omitted since it is a well-known method.

The forming solvent is not particularly limited as long as it is capable of sufficiently melting polyolefin. Examples thereof include aliphatic and cyclic hydrocarbons such as nonane, decane, undecane, dodecane and liquid paraffin; mineral oil distillates having a boiling point comparable to the boiling points of these hydrocarbons. However, a non-volatile solvent such as liquid paraffin is preferred.

The concentration of the polyolefin resin in the polyolefin resin solution is preferably 25 to 40 parts by weight, with respect to 100 parts by weight of the total amount of the polyolefin resin and the forming solvent. When the concentration of the polyolefin resin is adjusted within the above described preferred range, it is possible to prevent the occurrence of swelling or neck-in at the exit of a die, during the extrusion of the polyolefin resin solution therefrom, and to maintain the formability and self-supporting property of the gel-like sheet.

(b) Step of Forming Unstretched Gel-Like Sheet

In the step of forming an unstretched gel-like sheet, the polyolefin resin solution is supplied to a die directly from an extruder or through another extruder, and extruded in the form of a sheet, followed by cooling, to form an unstretched gel-like sheet. Alternatively, a plurality of polyolefin solutions having the same or different compositions may be supplied to one die from respective extruders, laminated in layers thereat, and then extruded in the form of a sheet.

The extrusion method may be either a flat die method or an inflation method. The extrusion is preferably carried out at an extrusion temperature of 140 to 250° C., and at an extrusion rate of 0.2 to 15 m/min. The adjustment of film thickness can be carried out by adjusting the amounts of the respective polyolefin solutions to be extruded. As the extrusion method, methods disclosed in JP 06-104736 B and JP 3347835 B can be used, for example.

The resulting polyolefin resin solution extruded in the form of a sheet is then cooled to form a gel-like sheet. The cooling can be carried out by using a method in which the extruded resin solution is brought into contact with a coolant such as cold blast or cooling water, a method in which the extruded resin solution is brought into contact with a chill roll, or the like. However, the extruded resin solution is preferably cooled by being brought into contact with a roll cooled by a coolant. For example, the polyolefin resin solution extruded in the form of a sheet can be brought into contact with a rotatable chill roll whose surface temperature is adjusted to 20° C. to 40° C. with a coolant, to form an unstretched gel-like sheet. The extruded polyolefin resin solution is preferably cooled to 25° C. or lower.

(c) Longitudinal Stretching Step

In the longitudinal stretching step, the unstretched gel-like sheet obtained by the above described step is passed through a plurality of preheating rolls to be heated to a predetermined temperature, and the unstretched gel-like sheet is then passed through at least three sets of longitudinal stretching rolls, whose peripheral speeds are set at progressively higher rates in the direction in which the sheet passes, to be stretched in the longitudinal direction, to obtain a longitudinally stretched gel-like sheet.

It is important to prevent sheet slippage in the longitudinal stretching step, and carry out longitudinal stretching uniformly to control the F25 value in the longitudinal direction.

In the stretching step, one longitudinal stretching roll, and one or more nip rolls in contact with the longitudinal stretching roll in parallel at a certain pressure, are defined as one set of rolls, and the unstretched gel-like sheet is allowed to pass through at least three sets of rolls, to be longitudinally stretched based on peripheral speed ratios between respective adjacent longitudinal stretching rolls. By disposing the nip rolls in parallel with the longitudinal stretching rolls, it is possible to allow the sheet to be closely adhered onto the longitudinal stretching rolls, and allow for a stable transport of the sheet due to being able to fix the stretching position of the sheet, thereby enabling a uniform longitudinal stretching. Further, to carry out a uniform longitudinal stretching, it is preferred to stretch the sheet to a desired magnification by carrying out the longitudinal stretching step in two or more stretching stages, rather than in a single stretching stage. That is, it is important to dispose three or more sets of longitudinal stretching rolls.

It is important that the unstretched gel-like sheet be stretched in the longitudinal direction by setting the peripheral speeds of the respective stretching rolls at progressively higher rates in the direction in which the sheet passes. Further, it is preferred that the peripheral speed ratios between respective adjacent stretching rolls be also set at progressively higher rates. In other words, the peripheral speed ratio between a first stretching roll and a second stretching roll, the peripheral speed ratio between the second stretching roll and a third stretching roll, and the peripheral speed ratio between the third stretching roll and a fourth stretching roll are set at progressively higher rates in this order. This arrangement allows for controlling the variation range of the F25 in the longitudinal direction and improving productivity, at the same time. The reason for the above is as follows. At the point when the unstretched gel-like sheet passes through the first stretching roll, the unstretched gel-like sheet contains a large amount of forming solvent, and thus is susceptible to slippage. However, when the peripheral speed ratios between respective two adjacent stretching rolls are set at progressively higher rates, an effect of squeezing the forming solvent is more easily obtained, and the slippage of the unstretched gel-like sheet during the longitudinal stretching step can be prevented. The effect of squeezing the forming solvent as used herein refers to an effect of squeezing the forming solvent out of the unstretched gel-like sheet to prevent slippage of the sheet on the longitudinal stretching rolls, thereby allowing for a stable stretching.

The upper limit of the peripheral speed ratio between adjacent stretching rolls in the first stage of the stretching step is preferably 1.5 or less, and more preferably 1.3 or less, and still more preferably 1.2 or less; and the lower limit thereof is preferably 1.1. Further, the differences in the peripheral speed ratios between respective adjacent stretching rolls are each preferably 0.5 or less, preferably 0.4 or less, and more preferably 0.3 or less.

Adjacent stretching rolls are preferably disposed at an interval such that the distance from the point at which the gel-like formed sheet being stretched comes out of contact with one stretching roll, to the point at which the sheet comes into contact with the next stretching roll, is 150 mm to 500 mm. When the interval between adjacent stretching rolls is adjusted within the above described preferred range, it is possible to reduce the variation range of the F25 value, as well as to prevent the occurrence of stretching plaques due to a decrease in the temperature of the gel-like formed sheet being stretched.

The longitudinal stretching step is carried out at a temperature equal to or lower than the melting point of the polyolefin resin +10° C. Further, the sheet is preferably stretched to a magnification of preferably 3-fold or more, and more preferably 4-fold to 10-fold, from the viewpoint of the elasticity and the strength of the resulting polyolefin microporous membrane.

The surface temperatures of the longitudinal stretching rolls are controlled such that the variation range of the surface temperature of each stretching roll in its effective width (the width within which the sheet being stretched passes through) is within ±2° C. The surface temperature of each longitudinal stretching roll can be measured, for example, by an infrared thermometer.

The longitudinal stretching rolls are preferably hard chromium-plated metal rolls having a surface roughness of 0.3 S to 5.0 S. When the surface roughness is within the above range, the stretching rolls have a good thermal conductivity, and the slippage of the sheet can be effectively prevented due to a synergistic effect with the nip rolls.

The nip rolls are used to prevent slippage of the sheet in the longitudinal stretching step. Merely increasing the contact area between the longitudinal stretching rolls and the gel-like sheet, without using the nip rolls, may not be able to provide a sufficient effect of preventing the slippage, and there is a risk that the variation range of the F25 values is increased. Further, if only one nip roll is used to prevent slippage of the sheet, the pressure (also referred to as "nip pressure") at which the nip roll comes into contact with a stretching roll needs to be increased and, thus, there is a risk that the micropores in the resulting polyolefin microporous membrane may be crushed. Accordingly, it is important, in this stretching step, that three or more nip rolls be used, and the nip pressure of each nip roll against each longitudinal stretching roll to be paired therewith is reduced to a relatively small level. A plurality of nip rolls may be used for one longitudinal stretching roll.

The nip pressure of each nip roll is 0.05 MPa or more and 0.5 Mpa or less. When the nip pressure of the nip roll is greater than 0.5 MPa, there is a risk that the micropores in the resulting polyolefin microporous membrane may be crushed. When the nip pressure is less than 0.05 MPa, on the other hand, it is insufficient to obtain the effect of preventing slippage of the sheet and, in addition, the effect of squeezing the forming solvent is not easily obtained. The lower limit of the nip pressure of the nip roll is preferably 0.1 MPa, and more preferably 0.2 MPa; and the upper limit thereof is preferably 0.5 MPa, and more preferably 0.4 MPa. When the nip pressure of the nip roll is within the above mentioned preferred range, an adequate effect of preventing the slippage can be obtained.

Further, each nip roll needs to be coated by a heat resistant rubber. During the longitudinal stretching step, the forming solvent bleeds out from the gel-like sheet due to heat or pressure caused by tensile force. In particular, the bleed-out occurring in the longitudinal stretching step immediately after the extrusion is pronounced. As a result, the transportation and stretching of the sheet are carried out with the bled-out forming solvent present at interfaces between the sheet and the roll surfaces, making the sheet susceptible to slippage. By disposing the nip rolls coated with a heat resistant rubber to come into contact with the longitudinal stretching rolls in parallel, and allowing the unstretched gel-like sheet to pass between the stretching rolls and the nip rolls, it is possible to carry out stretching while squeezing the forming solvent out of the gel-like sheet being stretched, thereby preventing slippage of the sheet.

Each nip roll is preferably a roll obtained by coating a heat resistant rubber to a coating thickness of 3 to 20 mm, on a metal roll having a diameter of 100 mm to 300 mm. It is not preferable to use a so-called rubber roll in which the volume of the portion made of a heat resistant rubber accounts for 80% or more of the volume of the roll because the roll is susceptible to deflection, and it is difficult to apply a uniform pressure in the width direction.

If a method (also referred to as scraping means) of removing the forming solvent adhered to the longitudinal stretching rolls and nip rolls is used in combination, in the longitudinal stretching step, the effect of preventing slippage can be obtained more effectively. The scraping means is not particularly limited, and it is possible to use a method using a doctor blade, a method in which compressed air is used to blow away the solvent, a method utilizing suction, or a mixture of these methods. In particular, the method using a doctor blade to scrape off the solvent can be carried out relatively easily, and is therefore preferred. Specifically, a method is preferred in which a doctor blade is disposed on a longitudinal stretching roll such that the blade is in parallel with the width direction of the longitudinal stretching roll, and the forming solvent is scraped off by the blade from the surface of the stretching roll, to the extent that the residual solvent cannot be visually observed on the roll surface from the point immediately after passing the doctor blade until the point where the gel-like sheet being stretched comes into contact therewith. One doctor blade or a plurality of doctor blades may be used. Further, the scraping means may be provided on either a longitudinal stretching roll or a nip roll, or alternatively, on both.

Materials for the doctor blade are not particularly limited, and any material having resistance to the forming solvent can be used. However, a doctor blade made of resin or rubber is preferred, rather than one made of metal. A doctor blade made of metal has a risk of causing scratches on the stretching roll. Examples of the doctor blade made of resin include a blade made of polyester, a blade made of polyacetal, and a blade made of polyethylene.

(d) Transverse Stretching Step

In the transverse stretching step, both ends of the longitudinally stretched gel-like sheet are fixed with clips, and then the clips are extended apart from each other in the transverse direction within a tenter to stretch the longitudinally stretched gel-like sheet in the transverse direction, to obtain a biaxially stretched gel-like sheet. At this time, the clip-to-clip distance in the travelling direction of the sheet is preferably maintained at 50 mm or less, more preferably 25 mm or less, and still more preferably 10 mm or less, from the entrance to the exit of the tenter. When the clip-to-clip distance is within the above preferred range, it is possible to reduce the variation range of the F25 value in the width direction.

In the transverse stretching step, or the heat treatment step to be described below, it is preferred that the area within the tenter be divided in 10 to 30 zones, and the temperature of each zone be controlled independently so that the impact due to sudden temperature changes can be reduced. In particular, it is preferred that the temperatures in the respective zones be adjusted to progressively higher temperatures in the sheet travelling direction, with hot blast, toward the zone in which the temperature is controlled to the highest temperature in the heat treatment step so that sudden temperature changes between the respective zones in the heat treatment step can be prevented.

(e) Step of Removing Forming Solvent from Biaxially Stretched Gel-Like Sheet, Followed by Drying A removal/cleaning solvent is used to carry out the removal (cleaning) of the forming solvent from the biaxially stretched gel-like sheet. Examples of the cleaning solvent include volatile solvents, for example: hydrocarbons such as pentane, hexane, and heptane; chlorinated hydrocarbons such as methylene chloride, and carbon tetrachloride; fluorinated hydrocarbons such as ethane trifluoride; and ethers such as diethyl ether and dioxane. These cleaning solvents can be selected as appropriate depending on the type of forming solvent used for dissolving polyolefin, and are used singly or as a mixture. The cleaning can be carried out by a method of immersing the sheet in the cleaning solvent to extract the forming solvent, a method of showering the cleaning solvent on the sheet, a method of sucking the cleaning solvent from the opposite side of the sheet, or a combination of these methods. The cleaning as described above is carried out until the amount of the residual solvent in the sheet is reduced to less than 1% by weight. Subsequently, the sheet is subjected to drying, and the drying can be carried out by a method such as heat drying or air drying.

(f) Step of Subjecting Dried Sheet to Heat Treatment to Obtain Polyolefin Microporous Membrane The dried sheet is subjected to a heat treatment to obtain a polyolefin microporous membrane. The heat treatment is preferably carried out at a temperature of 90 to 150° C. from the viewpoint of improving heat shrinkage and air resistance. The residence time in the heat treatment step is not particularly limited. In general, however, the residence time is preferably one second or more and 10 minutes or less, and more preferably three seconds or more and two minutes or less. The heat treatment can be carried out by any of a tenter method, a roll method, a rolling method, and a free method.

In the heat treatment step, the sheet is preferably allowed to shrink at least in one of the longitudinal direction and the width direction, while fixing the sheet in both the longitudinal direction and the width direction. The heat treatment step allows for eliminating the strain remaining in the polyolefin microporous membrane. The shrinkage in the longitudinal direction or the width direction in the heat treatment step is preferably 0.01 to 50%, and more preferably 3 to 20%, from the viewpoint of the heat shrinkage and the air resistance. Further, the sheet may be subjected to re-heating and re-stretching to improve mechanical strength. The re-stretching step may be carried out either by a stretching roll method or a tenter method. After carrying out the steps (a) to (f), a step(s) of imparting a function(s) such as a corona treatment step and/or a hydrophilizing step, may be carried out as necessary.

In the forming process of the polyolefin microporous membrane, the upper limit of the tensile force during the transport from the longitudinal stretching step to a winding step is 60 N/m, preferably 50 N/m, and more preferably 45 N/m; and the lower limit thereof is 20 N/m, preferably 30 N/m, and more preferably 35 N/m. When the tensile force during the transport from the longitudinal stretching step to the winding step is adjusted within the above preferred range, it is possible to prevent an increase in the variation range of the F25 value due to the fluttering of the membrane during the transport, as well as to reduce variations in the thickness due to deformation of the polyolefin microporous membrane.

Further, in the forming process of the polyolefin microporous membrane, the polyolefin microporous membrane is transported for an aerial transport distance of 2 m or less, and preferably 1.5 m or less. The aerial transport distance refers to the distance from the position of the last nip roll in the longitudinal stretching step to the point where the membrane starts to be held by clips, namely, the "clip-holding starting point", in the transverse stretching step. Alternatively, when supporting rolls are used, the aerial transport distance refers to either the distance from the position of the last nip roll in the longitudinal stretching step to the corresponding supporting roll, or the distance from the clip-holding starting point in the transverse stretching step to the corresponding supporting roll. When the aerial transport distance is adjusted to 2 m or less, it is possible to prevent the fluttering of the polyolefin microporous membrane during the transport. To secure a sufficient working area, in general, a distance of about 3 to 5 m is required as the distance from the position of the last nip roll in the longitudinal stretching step to the clip-holding starting point in the transverse stretching step. In this case, each of the supporting rolls or the like are disposed at a position equal to or less than 2 m from each of the positions of the last nip roll in the longitudinal stretching step, and the clip-holding starting point in the transverse stretching step. In producing a polyolefin microporous membrane having a thickness of less than 7 μm, the fluttering of the membrane during the transport is likely to be increased, and result in an unstable tensile force. Therefore, it is necessary to adjust the aerial transport distance to 2 m or less to form a polyolefin microporous membrane having a thickness of less than 7 μm and a variation range of the F25 value in the longitudinal direction of 1 MPa or less.

As described above, it is possible to reduce the variation range of the F25 value in the longitudinal direction of the polyolefin microporous membrane, by controlling the longitudinal stretching and the transverse stretching at a high level. This not only facilitates a reduction in the variation range of the coating thickness in the step of laminating a porous layer to be described later, but also allows for obtaining a battery separator roll having a good winding appearance. Further, by adjusting the variation range of the F25 value to 1 MPa or less, it is possible to prevent the microporous membrane from meandering during the transport in the slitting step or the coating step, even when the membrane is processed at a high speed, for example, when the membrane is wound by a rewinder at a transport rate of greater than 50 m/min.

The width of the polyolefin microporous membrane is not particularly limited. However, the lower limit of the width is preferably 500 mm, more preferably 600 mm, and still more preferably 1,000 mm; and the upper limit of the width is preferably 4,000 mm, more preferably 3,000 mm, and still more preferably 2,000 mm. When the width of the polyolefin microporous membrane is adjusted within the above range, the microporous membrane is suitable for production of a battery having a high capacity, and is less susceptible to deflection due to self-weight.

The lower limit of the length of the polyolefin microporous membrane is preferably 1,000 m, more preferably 2,000 m, and still more preferably 3,000 m. The upper limit is not particularly defined. However, it is preferably 10,000 m, more preferably 8,000 m, and still more preferably 7,000 m. When the length of the polyolefin microporous membrane is within the above range, the productivity is improved, and the polyolefin microporous membrane is less susceptible to deflection due to self-weight when wound into a roll.

The polyolefin microporous membrane preferably has a thickness of 5 to 25 μm, from the viewpoint of increasing the capacity of the resulting battery.

The polyolefin microporous membrane preferably has an air resistance of 50 sec/100 cc Air to 300 sec/100 cc Air.

The polyolefin microporous membrane preferably has a porosity of 30 to 70%.

The polyolefin microporous membrane preferably has an average pore diameter of 0.01 to 1.0 μm, from the viewpoint of improving pore blocking performance.

3. Porous Layer

The porous layer is provided to impart or improve at least one of the functions such as heat resistance, adhesion to an electrode material, and electrolyte permeability. The porous layer is composed of inorganic particles and a resin(s). The resin serves to bind inorganic particles with one another, and bind the polyolefin microporous membrane and the porous layer, in addition to imparting or improving the above described function(s).

The resin may be, for example, at least one resin selected from the group consisting of fluorine resins, acrylic resins, polyvinyl alcohol resins, and cellulose ether resins. A polyvinyl alcohol resin or a cellulose ether resin is preferred from the viewpoint of improving the heat resistance, and a polyvinylidene fluoride resin is preferred from the viewpoint of improving the electrode adhesion and affinity with a non-aqueous electrolyte solution. Examples of the polyvinyl alcohol resin include polyvinyl alcohol and derivatives thereof. Examples of the cellulose ether resin include carboxymethyl cellulose (CMC) and derivatives thereof, hydroxyethyl cellulose (HEC), carboxyethyl cellulose, methyl cellulose, ethyl cellulose, cyanoethyl cellulose, and oxyethyl cellulose. Examples of the polyvinylidene fluoride resin include vinylidene fluoride homopolymers, and vinylidene fluoride-fluorinated olefin copolymers. The resin may be at least one selected from the group consisting of cellulose ether resins and polyvinylidene fluoride resins. Since the polyvinylidene fluoride resin has an excellent adhesion to an electrode, a high affinity with a nonaqueous electrolyte solution, as well as high chemical and physical stabilities against a nonaqueous electrolyte solution, it is possible to maintain a sufficient affinity with an electrolyte solution, even when used under high temperature conditions. In particular, a polyvinylidene fluoride-hexafluoropropylene copolymer is especially suitable from the viewpoint of improving the electrode adhesion.

The resin may be used as an aqueous solution or an aqueous dispersion thereof, or may be used dissolved in an organic solvent capable of dissolving the resin. Examples of the solvent that can be used to dissolve the polyvinylidene fluoride resin include N,N-dimethylacetamide (DMAc), N-methyl-2-pyrrolidone (NMP), hexamethylphosphoric triamide (HMPA), N,N-dimethylformamide (DMF), dimethyl sulfoxide (DMSO), γ-butyrolactone, chloroform, tetrachloroethane, dichloroethane, 3-chloronaphthalene, parachlorophenol, tetralin, acetone, and acetonitrile.

The porous layer preferably contains inorganic particles to reduce the curl of the resulting separator as a result of laminating the porous layer. Examples of the inorganic particles include particles of: calcium carbonate, calcium phosphate, amorphous silica, crystalline glass, kaolin, talc, titanium dioxide, alumina, silica-alumina composite oxide, barium sulfate, calcium fluoride, lithium fluoride, zeolite, molybdenum sulfide, mica, and boehmite. Further, crosslinked polymer particles may be added, as necessary. Examples of the crosslinked polymer particles include crosslinked polystyrene particles, crosslinked acrylic resin particles, and crosslinked methyl methacrylate particles. The inorganic particles may be, for example, in the shape of true spheres, approximate spheres, plates, needles, or polyhedrons, but not particularly limited thereto.

The inorganic particles preferably have an average particle size of 1.5 times or more and 50 times or less, and more preferably 2 times or more and 20 times or less the average pore diameter of the polyolefin microporous membrane. When the average particle size of the inorganic particles is within the above preferred range, it is possible to prevent the heat resistant resin and the particles present in a mixed state, from clogging the micropores in the polyolefin microporous membrane. As a result, the air resistance can be maintained. Further, having such an average particle size allows for preventing the falling out of the particles in a battery assembly step, and thereby preventing the occurrence of serious scratches in the resulting battery.

The upper limit of the content of the inorganic particles contained in the porous layer is preferably 98 vol %, and more preferably 95 vol %. The lower limit thereof is preferably 50 vol %, and more preferably 60 vol %. When the amount of the inorganic particles added is within the above preferred range, a sufficient effect of reducing the curl can be obtained, and the proportion of the functional resin is optimum with respect to the total volume of the porous layer.

The lower limit of the average thickness $T_{(ave)}$ of the porous layer is preferably 1 µm, more preferably 1.5 µm, and still more preferably 2.0 µm. The upper limit thereof is preferably 5 µm, more preferably 4 µm, and still more preferably 3 µm. When the film thickness of the porous layer is within the above preferred range, the thickness variation range (R) of the porous layer can be reduced. In a battery separator obtained by laminating the porous layer on the polyolefin microporous membrane, it is possible to secure the rupture strength and electrical insulation properties, when melted/shrunk at a temperature equal to or higher than the melting point. Further, such a battery separator is suitable for increasing the capacity of a battery since the winding volume of the resulting roll can be reduced.

The porous layer preferably has a porosity of 30 to 90%, and more preferably 40 to 70%. A desired porosity can be obtained by adjusting as appropriate the concentration of the inorganic particles and the concentration of a binder.

4. Method of Laminating Porous Layer on Polyolefin Microporous Membrane

It is possible to obtain a battery separator by laminating the porous layer on a polyolefin microporous membrane having a variation range of the F25 value in the longitudinal direction of 1 MPa or less. When the polyolefin microporous membrane is used, the contact pressure at the tangential line (hereinafter, abbreviated as "coating tangential line") between the polyolefin microporous membrane and a coating roll is more likely to be uniform with respect to the longitudinal direction of the polyolefin microporous membrane, facilitating to obtain a uniform coating thickness.

The method of laminating the porous layer on the polyolefin microporous membrane is not particularly limited, as long as it is a wet coating method. For example, the lamination can be achieved by a method in which a coating liquid containing a resin, inorganic particles and a dispersion solvent is coated on the polyolefin microporous membrane to a predetermined film thickness, by a known roll coating method to be described later, followed by drying at a temperature of 40 to 80° C., for a period of time of five seconds to 60 seconds.

Examples of the roll coating method include a reverse roll coating method and a gravure coating method, and these methods can be used singly or in combination. Of these, the gravure coating method is preferred in terms of obtaining a uniform coating thickness.

The thickness of the coating tangential line between the coating roll and the polyolefin microporous membrane, in the roll coating method, is preferably 3 mm or more and 10 mm or less. When the thickness of the coating tangential line is greater than 10 mm, the contact pressure between the polyolefin microporous membrane and the coating roll is increased, making the resulting coating surface more susceptible to scratches.

Figure 6:
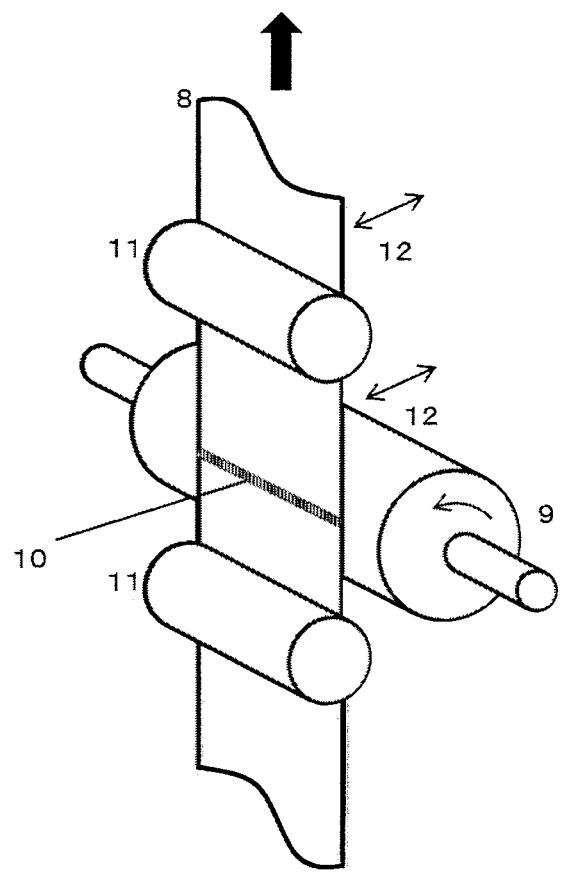
FIG. 6 is a schematic diagram showing an example of coating apparatus.

The "coating tangential line" as used herein refers to a line at which a coating roll and the polyolefin microporous membrane come into contact with each other, and the "thickness of the coating tangential line" as used herein refers to the width of the coating tangential line in the longitudinal direction (see FIG. 6). The thickness of the coating tangential line can be measured by observing the coating tangential line between the coating roll and the polyolefin microporous membrane, from the back surface of the polyolefin microporous membrane. The thickness of the coating tangential line can be adjusted by: adjusting the position of the coating roll relative to the polyolefin microporous membrane, forward and backward; and by adjusting the right and left balance in the horizontal direction, of the positions of back rolls disposed at the back side of the coating surface. The back rolls function more effectively, when they are disposed one each at both upstream and downstream of the position of the coating roll.

The coating roll used in the roll coating method preferably has a deflection accuracy of equal to or less than 10 µm/Φ100 mm, more preferably equal to or less than 8 µm/Φ100 mm, and still more preferably equal to or less than 5 µm/Φ100 mm. When the deflection accuracy of the coating roll is within the above preferred range, a uniform coating thickness is more easily obtained, also in the longitudinal direction. Although a coating roll having a higher deflection accuracy is more expensive, use of such a coating roll is important.

The expression that the porous layer has a uniform thickness in the longitudinal direction of the separator, as used herein, means that the thickness variation range (R) of the porous layer is 1.0 μm or less, with respect to 1,000 m of the length of the separator. The thickness variation range (R) is preferably 0.8 μm or less, and more preferably 0.5 μm or less.

The solid concentration of the coating liquid is not particularly limited, as long as the coating liquid can be coated uniformly. However, the solid concentration is preferably 20% by weight or more and 80% by weight or less, and more preferably 50% by weight or more and 70% by weight or less. When the solid concentration of the coating liquid is within the above preferred range, a porous layer having a uniform coating thickness is more likely to be obtained, and the resulting porous layer can be prevented from being fragile.

5. Battery Separator

A battery separator obtained by laminating the porous layer on the polyolefin microporous membrane preferably has a film thickness of 4 μm to 12 μm, from the viewpoint of improving the mechanical strength and battery capacity.

The width of the battery separator is not particularly limited. However, the lower limit of the width is preferably 30 mm, more preferably 60 mm, and still more preferably 100 mm; and the upper limit thereof is preferably 2,000 mm, more preferably 1,000 mm, and still more preferably 800 mm. When the width of the battery separator is within the above range, the battery separator is suitably used in the production of a battery having a high capacity, and is less susceptible to deflection due to self-weight.

The lower limit of the length of the battery separator is preferably 1,000 m, more preferably 2,000 m, and still more preferably 3,000 m. The upper limit is not particularly defined. However, the upper limit is preferably 10,000 m, more preferably 8,000 m, and still more preferably 7,000 m. When the length of the battery separator is within the above range, the productivity of the battery separator is improved, and the battery separator is less susceptible to deflection due to self-weight, when wound into a roll.

The battery separator can be used: as a separator for a secondary battery such as a nickel-hydrogen battery, a nickel-cadmium battery, a nickel-zinc battery, a silver-zinc battery, a lithium secondary battery or a lithium polymer secondary battery; or as a separator for a plastic film capacitor, a ceramic capacitor or an electric double layer capacitor. In particular, the battery separator is preferably used as a separator for a lithium ion secondary battery. A description will be given below, with reference to an example in which the battery separator is used in a lithium ion secondary battery. A lithium ion secondary battery includes: an electrode body composed of a positive electrode and a negative electrode which are laminated one on another with a separator interposed therebetween; and an electrolyte solution (electrolyte). The structure of the electrode body is not particularly limited, and the electrode body may have any known structure. The electrode body may have, for example: an electrode structure in which a disk-like positive electrode and negative electrode are disposed to face one another (coin type); an electrode structure in which plate-like positive electrodes and negative electrodes are laminated alternately (laminated type); and an electrode structure in which a belt-like positive electrode and negative electrode are layered one on another and wound (wound-type).

EXAMPLES

Our membranes, separators and methods will now be described specifically with reference to Examples. However, this disclosure is in no way limited by the Examples. Measured values described in the Examples are values measured according to the following methods.

1. Measurement of Variation Range of F25 Value

Four test specimens (TD 10 mm×MD 50 mm) were cut out from four locations at regular intervals along the width direction, from each of the polyolefin microporous membranes obtained in Examples and Comparative Examples. The test specimens were cut out from locations of each membrane where the distances from both ends in the longitudinal direction are 100 m or more, and the distances from the ends in the width direction are 30 mm to 40 mm. Using a table-top type precision universal tester (Autograph AGS-J (manufactured by Shimadzu Corporation)), an S-S curve (the relationship between stress and strain) in the longitudinal direction of each test specimen was obtained, in accordance with JIS K7113. A value of the stress at a point where the strain had increased by 25% was read, and the thus read value was divided by the value of the cross-sectional area of each test specimen. The thus calculated value was defined as the F25 value of each test specimen, and the mean value of the F25 values of the four test specimens was then obtained, as the mean F25 value in the width direction. Further, the mean F25 value in the width direction was then obtained at four locations in the longitudinal direction at intervals of 250 m. From the difference between the maximum value and the minimum value of the thus obtained mean F25 values in the width direction, the variation range of the F25 value was determined. A polyolefin microporous membrane obtained by removing by peeling the porous layer from a battery separator may also be used for preparing test specimens.

Measurement Conditions

Load cell capacity: 1 kN

Clip-to-clip distance: 20 mm

Test speed: 20 mm/min

Measurement environment: air temperature: 20° C., relative humidity: 60%

2. Variation Range (R) of Film Thickness of Porous Layer in Longitudinal Direction Four test specimens each having a size of TD: 10 mm×MD: 50 mm were cut out at regular intervals along the width direction, from each of the polyolefin microporous membranes obtained in Examples and Comparative Examples. The test specimens of both end portions were cut out from the locations 30 mm to 40 mm inside from the end portions in the width direction, of each microporous membrane.

The thickness of the porous layer was obtained by an SEM observation of the cross section of each of the test specimens. The test specimens for cross-sectional observation were prepared by a cryogenic-CP method, and the SEM observation was carried out with a trace amount of metal microparticles vapor-deposited thereon to prevent charging-up due to electron beams. The region where the inorganic particles are present was determined as the porous layer, and the film thickness of the porous layer was measured in each specimen. The mean value of the measured film thicknesses in the four test specimens was then obtained, as the mean film thickness in the width direction of the porous layer. The mean film thickness in the width direction was then obtained at four locations in the longitudinal direction at intervals of 250 m, and the difference between the maximum value and the minimum value of the thus obtained mean film thicknesses was defined as the thickness variation range (R) of the porous layer in the longitudinal direction. The mean value of the measured thicknesses in the total 16 test specimens described above was defined as the average thickness $T_{(ave)}$ of the porous layer.

Measurement Apparatus

Field emission-type scanning electron microscope (FE-SEM) S-4800 (manufactured by Hitachi High-Technologies Corporation)

Cross-section Polisher (CP) SM-9010 (manufactured by JEOL Ltd.)

Measurement Conditions

Accelerating voltage: 1.0 kV

3. Variation Range of Surface Temperature of Longitudinal Stretching Roll

The surface temperature of each longitudinal stretching roll was measured five times at intervals of five minutes with an infrared thermometer, and the variation range of the surface temperature of the longitudinal stretching roll was obtained from the difference between the maximum value and the minimum value of the measured temperatures.

4. Measurement of Thickness of Coating Tangential Line

The coating tangential line refers to a line extending in the width direction, at which line the coating roll and the polyolefin microporous membrane come into contact with each other, during the coating. The thickness of the coating tangential line refers to the width of the coating tangential line in the longitudinal direction, and to a value read through the back surface of the polyolefin microporous membrane, using a scale.

5. Winding Appearance

Each of the rolls of the battery separators obtained in Examples and Comparative Examples was visually observed and the number of locations where the deflection or winding displacement had occurred was counted.

Evaluation Criteria

○ (Good): none

Δ (Acceptable): one to three locations x (Poor): four or more locations

6. Evaluation of Scratches

After removing its outermost peripheral portion from each of the rolls of the battery separators obtained in Examples and Comparative Examples, 1 m² of its inner peripheral portion was drawn from each roll to be used as an evaluation sample.

For the detection of scratches, a brome light (a lighting device used for photographing or videotaping) was irradiated to the coating surface, and the presence of scratches was visually observed, and the number of the scratches was counted.

Evaluation Criteria

○ (Good): equal to or less than one location

Δ (Acceptable): two to five locations x (Poor): six or more locations

Preparation of Coating Liquid

Reference Example 1

Polyvinyl alcohol (average degree of polymerization: 1,700; degree of saponification: 99% or more), alumina particles (average particle size: 0.5 μm), and ion exchanged water were mixed at a weight ratio of 6:54:40, and the resultant was stirred sufficiently to obtain a uniform dispersion. The resulting dispersion was then filtered using a filter having a filtration limit of 5 to obtain a coating liquid (a).

Reference Example 2

A copolymer ("POVACOAT" (registered trademark), manufactured by Nisshin Kasei Co., Ltd.) of polyvinyl alcohol, acrylic acid and methyl methacrylate; alumina particles (average particle size: 0.5 μm); and a solvent (a mixture of ion exchanged water: ethanol=70:30 (weight ratio)) were mixed at a weight ratio of 5:45:50, and the resultant was stirred sufficiently to obtain a uniform dispersion. The resulting dispersion was then filtered using a filter having a filtration limit of 5 μm to obtain a coating liquid (b).

Reference Example 3

A polyvinylidene fluoride-hexafluoropropylene copolymer (VdF/HFP=92/8 (weight ratio), weight average molecular weight: one million), and a polyvinylidene fluoride-hexafluoropropylene copolymer (VdF/HFP=88/12 (weight ratio), weight average molecular weight: 600,000) were used as fluorine resins, and mixed such that the resulting coating liquid had a solution viscosity of 100 mPa·s.

Alumina particles (average particle size: 0.5 μm) in an amount of 50% by volume with respect to the total volume of the alumina particles and the fluorine resins; the fluorine resins; and N-methyl-2-pyrrolidone were mixed to achieve a solid concentration of 10% by weight. The fluorine resin component was completely dissolved, and the alumina particles were uniformly dispersed. The resultant was then filtered using a filter having a filtration limit of 5 μm, to obtain a coating liquid (c).

Example 1

Production of Polyolefin Microporous Membrane

A quantity of 100 parts by mass of a composition composed of: 40% by mass of an ultra-high molecular weight polyethylene having a mass average molecular weight of $2.5 \times 10^6$; and 60% by mass of a high density polyethylene having a mass average molecular weight of $2.8 \times 10^5$; was dry blended with 0.375 parts by mass of tetrakis[methylene-3-(3,5-ditertiarybutyl-4-hydroxyphenyl)-propionate]methane, to obtain a polyethylene composition. A quantity of 30 parts by weight of the resulting polyethylene composition was fed to a twin screw extruder. Further, 70 parts by weight of liquid paraffin was fed to the twin screw extruder through a side feeder, followed by melt blending, to prepare a polyethylene resin solution within the extruder. Subsequently, the resulting polyethylene resin solution was extruded through a die disposed at the distal end of the extruder, at 190° C., and the resulting extrudate was drawn onto a chill roll whose internal cooling water was maintained at a temperature of 25° C., to prepare an unstretched gel-like sheet.

The resulting unstretched gel-like sheet was allowed to pass through four preheating rolls such that the surface temperature of the sheet was increased to 110° C., and then led to a longitudinal stretching apparatus (1) shown in FIG. 1. As the longitudinal stretching rolls, hard chromium-plated metal rolls (surface roughness: 0.5 S) having a width of 1,000 mm and a diameter of 300 mm were used. The surface temperature of each of the longitudinal stretching rolls was 110° C. Doctor blades made of polyester were used as the doctor blades. As the nip rolls, nitrile rubber-coated rolls (manufactured by Katsura Roller Mfg. Co., Ltd.) were used. The longitudinal stretching apparatus (1) was used as the longitudinal stretching apparatus, and the peripheral speeds of the respective stretching rolls were set at progressively higher rates toward downstream in the traveling direction. Specifically, the peripheral speed ratio between the first stretching roll and the second stretching roll was set to 1.3; the peripheral speed ratio between the second stretching roll and the third stretching roll was set to 1.5; the peripheral speed ratio between the third stretching roll and the fourth stretching roll was set to 1.8; and the peripheral speed ratio between the fourth stretching roll and the fifth stretching roll was set to 2.1. Further, the interval between adjacent stretching rolls was adjusted such that the distance from the point at which the gel-like formed sheet being stretched comes out of contact with a stretching roll, to the point at which the sheet comes into contact with the next stretching roll, was 200 mm. The nip pressure of each nip roll was set to 0.3 MPa. In addition, the surface temperature of each stretching roll was controlled such that the variation range of the surface temperature was within ±2° C. Subsequently, the resulting sheet was allowed to pass through four chill rolls so that the sheet temperature was cooled to 50° C., to obtain a longitudinally stretched gel-like sheet.

Both end portions of the resulting longitudinally stretched gel-like sheet were held by clips, and stretched 6-fold in the transverse direction at a temperature of 115° C., in a tenter whose internal area had been divided into 20 zones, to form a biaxially stretched gel-like sheet. At this time, the interval between the clips in the sheet travelling direction was maintained at 5 mm from the entrance to the exit of the tenter. The tensile force during the transport from the longitudinal stretching step to the winding step was adjusted to 45 N/m, and the supporting rolls were disposed such that the aerial transport distance was 1.5 m.

Figure 5:
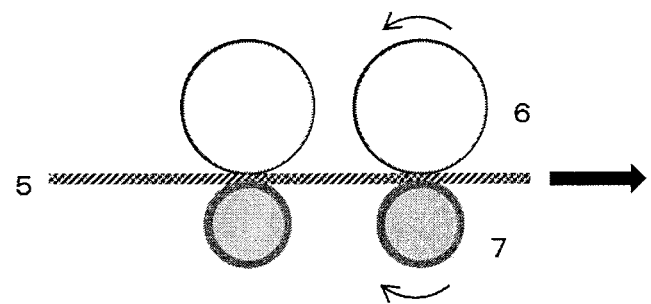
FIG. 5 is a schematic diagram showing an example of a longitudinal stretching apparatus which is used in re-stretching step.

The resulting biaxially stretched gel-like sheet was cooled to 30° C., and then liquid paraffin was removed in a washing bath of methylene chloride controlled at a temperature of 25° C., followed by drying in a drying furnace adjusted to 60° C. Thereafter, the thus obtained sheet was re-stretched by a re-stretching apparatus shown in FIG. 5 to a longitudinal magnification of 1.2-fold, and the resultant was subjected to a heat treatment at 125° C. for 20 seconds, to obtain a polyolefin microporous membrane having a thickness of 5 μm. Further, the resulting microporous membrane was wound at a transport rate of 50 m/min, to obtain a roll of the polyolefin microporous membrane, having a width of 4,000 mm and a winding length of 5,100 m. The polyolefin microporous membrane was unwound from the resulting roll, and subjected to slitting to be processed into a width of 950 mm, to obtain a polyolefin microporous membrane (A) to be used as a substrate for coating.

Example 2

Figure 2:
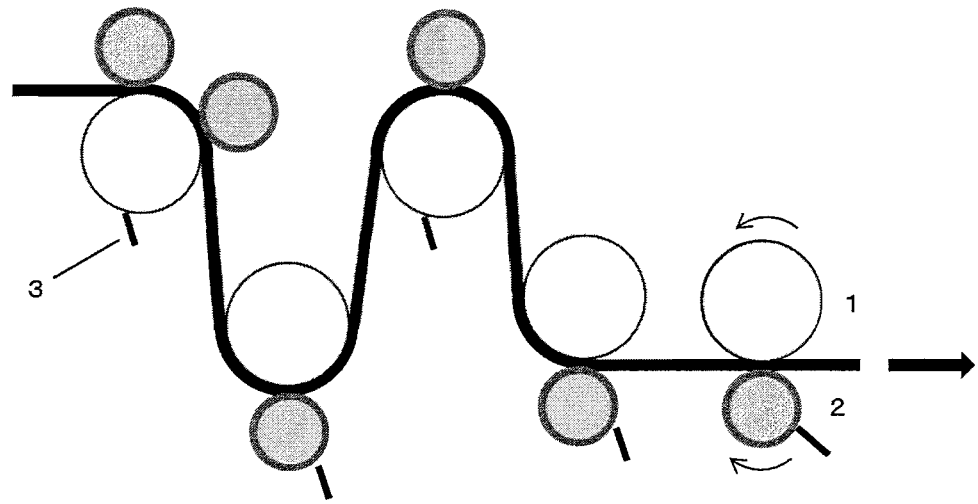
FIG. 2 is a schematic diagram showing a longitudinal stretching apparatus (2) which is used for sequential biaxial stretching.

The same procedure as in Example 1 was repeated, except that a longitudinal stretching apparatus (2) shown in FIG. 2 was used instead of the longitudinal stretching apparatus (1), as the longitudinal stretching apparatus, to obtain a polyolefin microporous membrane (B).

Example 3

Figure 3:
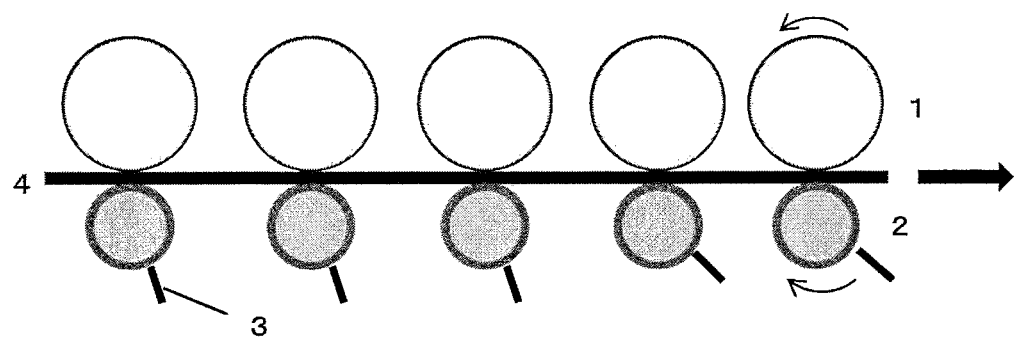
FIG. 3 is a schematic diagram showing a longitudinal stretching apparatus (3) which is used for sequential biaxial stretching.

The same procedure as in Example 1 was repeated, except that a longitudinal stretching apparatus (3) shown in FIG. 3 was used instead of the longitudinal stretching apparatus (1), as the longitudinal stretching apparatus, to obtain a polyolefin microporous membrane (C).

Example 4

Figure 4:
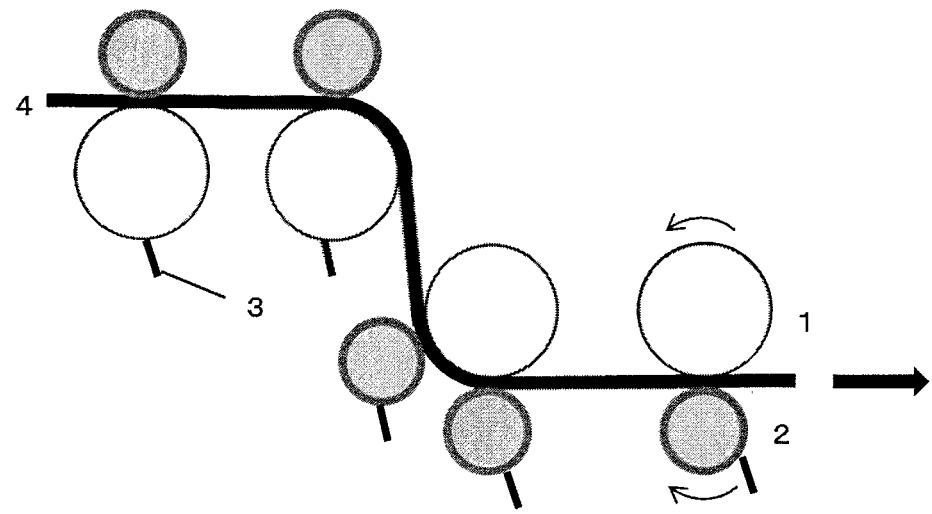
FIG. 4 is a schematic diagram showing a longitudinal stretching apparatus (4) which is used for sequential biaxial stretching.

The same procedure as in Example 1 was repeated, except: that a longitudinal stretching apparatus (4) shown in FIG. 4 was used instead of the longitudinal stretching apparatus (1), as the longitudinal stretching apparatus; and that, in the longitudinal stretching apparatus (4), the peripheral speed ratio between the first stretching roll and the second stretching roll was set to 1.5; the peripheral speed ratio between the second stretching roll and the third stretching roll was set to 2.0; and the peripheral speed ratio between the third stretching roll and the fourth stretching roll was set to 2.5; to obtain a polyolefin microporous membrane (D).

Example 5

The same procedure as in Example 1 was repeated, except that the nip pressure of each nip roll was adjusted to 0.1 MPa in the longitudinal stretching apparatus (1), to obtain a polyolefin microporous membrane (E).

Example 6

The same procedure as in Example 1 was repeated, except that the nip pressure of each nip roll was adjusted to 0.5 MPa in the longitudinal stretching apparatus (1), to obtain a polyolefin microporous membrane (F).

Example 7

The amount of the polyethylene resin solution to be extruded was adjusted, and a polyolefin microporous membrane (G) having a thickness of 6 μm was obtained in the same manner as Example 1.

Example 8

The same procedure as in Example 1 was repeated, except that ceramic-coated metal rolls having a surface roughness of 5.0 S were used as the five longitudinal stretching rolls in the longitudinal stretching apparatus (1), to obtain a polyolefin microporous membrane (H).

Example 9

The same procedure as in Example 1 was repeated, except that, in the longitudinal stretching apparatus (1), the peripheral speed ratio between the first stretching roll and the second stretching roll was set to 1.2; the peripheral speed ratio between the second stretching roll and the third stretching roll was set to 1.5; the peripheral speed ratio between the third stretching roll and the fourth stretching roll was set to 1.8; and the peripheral speed ratio between the fourth stretching roll and the fifth stretching roll was set to 2.3; to obtain a polyolefin microporous membrane (I).

Example 10

The same procedure as in Example 1 was repeated, except that, in the longitudinal stretching apparatus (1), the peripheral speed ratio between the first stretching roll and the second stretching roll was set to 1.3; the peripheral speed ratio between the second stretching roll and the third stretching roll was set to 1.7; the peripheral speed ratio between the third stretching roll and the fourth stretching roll was set to 1.8; and the peripheral speed ratio between the fourth stretching roll and the fifth stretching roll was set to 1.9; to obtain a polyolefin microporous membrane (J).

Example 11

The amount of the polyethylene resin solution to be extruded was adjusted, and a polyolefin microporous membrane (K) having a thickness of 3 μm was obtained in the same manner as Example 1.

Comparative Example 1

The same procedure as in Example 1 was repeated, except that no nip roll was used for any of the five stretching rolls in the longitudinal stretching apparatus (1), to obtain a polyolefin microporous membrane (L).

Comparative Example 2

The same procedure as in Example 1 was repeated, except that the longitudinal stretching apparatus (2) was used instead of the longitudinal stretching apparatus (1), and that no nip roll was used for any of the five stretching rolls, to obtain a polyolefin microporous membrane (M).

Comparative Example 3

The same procedure as in Example 1 was repeated, except that the nip pressure of each nip roll was set to 0.04 MPa in the longitudinal stretching apparatus (1), to obtain a polyolefin microporous membrane (N).

Comparative Example 4

The same procedure as in Example 1 was repeated, except that hard chromium-plated metal rolls having a surface roughness of 0.1 S were used as the longitudinal stretching rolls in the longitudinal stretching apparatus (1), to obtain a polyolefin microporous membrane (O).

Comparative Example 5

The same procedure as in Example 1 was repeated, except that, in the longitudinal stretching apparatus (1), the peripheral speed ratio between the first stretching roll and the second stretching roll was set to 1.6; the peripheral speed ratio between the second stretching roll and the third stretching roll was set to 1.6; the peripheral speed ratio between the third stretching roll and the fourth stretching roll was set to 1.7; and the peripheral speed ratio between the fourth stretching roll and the fifth stretching roll was set to 1.7; to obtain a polyolefin microporous membrane (P).

Comparative Example 6

The same procedure as in Example 1 was repeated, except that, in the longitudinal stretching apparatus (1), the peripheral speed ratio between the first stretching roll and the second stretching roll was set to 1.1; the peripheral speed ratio between the second stretching roll and the third stretching roll was set to 1.3; the peripheral speed ratio between the third stretching roll and the fourth stretching roll was set to 1.5; and the peripheral speed ratio between the fourth stretching roll and the fifth stretching roll was set to 3.5; to obtain a polyolefin microporous membrane (Q).

Comparative Example 7

The same procedure as in Example 1 was repeated, except that, in the longitudinal stretching apparatus (1), the peripheral speed ratio between the first stretching roll and the second stretching roll was set to 1.3; the peripheral speed ratio between the second stretching roll and the third stretching roll was set to 1.7; the peripheral speed ratio between the third stretching roll and the fourth stretching roll was set to 1.8; and the peripheral speed ratio between the fourth stretching roll and the fifth stretching roll was set to 1.9; to obtain a polyolefin microporous membrane (R).

Comparative Example 8

The same procedure as in Example 1 was repeated, except that the variation range of the temperature of each of the longitudinal stretching rolls was within ±3° C. in the longitudinal stretching apparatus (1), to obtain a polyolefin microporous membrane (S).

Comparative Example 9

The same procedure as in Example 1 was repeated, except that the tensile force during the transport from the longitudinal stretching step to the winding step was adjusted to 50 N/m, and the areal transport distance from the position of the last nip roll in the longitudinal stretching step to the clip-holding starting point in the transverse stretching step was adjusted to 5 m, to obtain a polyolefin microporous membrane (T).

Preparation of Battery Separator

Example 12

To the polyolefin microporous membrane (A) obtained in Example 1, the coating liquid (a) was coated, using a coating apparatus (gravure coating method) shown in FIG. 6 at a transport rate of 50 m/min. The resultant was then allowed to pass through a hot air drying furnace controlled to 50° C. for 10 seconds to carry out drying, followed by slitting, to obtain a battery separator having a width of 900 mm and a winding length of 5,000 m, and including a porous layer having a thickness of 2 μm. During the coating, the positions of the coating roll and the back rolls in the coating apparatus were adjusted such that the thickness of the coating tangential line was 3 to 5 mm. As the coating roll, a gravure roll having a diameter of 100 mm and a deflection accuracy of 8 μm/Φ100 mm was used.

Examples 13 to 22

The same procedure as in Example 12 was repeated, except that the polyolefin microporous membranes (B) to (K) obtained in Examples 2 to 11 were used, to obtain battery separators.

Example 23

The same procedure as in Example 12 was repeated, except that the coating liquid (b) was used instead of the coating liquid (a), to obtain a battery separator.

Example 24

The same procedure as in Example 12 was repeated, except that the coating liquid (c) was used instead of the coating liquid (a), to obtain a battery separator.

Example 25

The same procedure as in Example 12 was repeated, except that a gravure roll having a diameter of 100 mm and a deflection accuracy of 10 μm/Φ100 mm was used as the coating roll, to obtain a battery separator.

Example 26

The same procedure as in Example 12 was repeated, except that a gravure roll having a diameter of 100 mm and a deflection accuracy of 5 μm/Φ100 mm was used as the coating roll, to obtain a battery separator.

Example 27

The same procedure as in Example 12 was repeated, except that the positions of the gravure roll and the back rolls in the coating apparatus were adjusted such that the thickness of the coating tangential line was 5 to 7 mm, to obtain a battery separator.

Example 28

The same procedure as in Example 12 was repeated, except that the positions of the gravure roll and the back rolls in the coating apparatus were adjusted such that the thickness of the coating tangential line was 8 to 10 mm, to obtain a battery separator.

Example 29

The same procedure as in Example 12 was repeated, except that the cell capacity of the gravure roll in the coating apparatus was changed so that the porous layer having a thickness of 4 μm was formed, to obtain a battery separator.

Example 30

The same procedure as in Example 12 was repeated, except that the porous layer was provided on each of both surfaces of the polyolefin microporous membrane A obtained in Example 1, to obtain a battery separator.

Comparative Examples 10 to 18

The same procedure as in Example 12 was repeated, except that the polyolefin microporous membranes (L) to (T) obtained in Comparative Examples 1 to 9 were used, to obtain battery separators.

Comparative Example 19

The same procedure as in Example 12 was repeated, except that a gravure roll having a diameter of 100 mm and a deflection accuracy of 12 μm/Φ100 mm was used as the coating roll, to obtain a battery separator.

Comparative Example 20

The same procedure as in Example 12 was repeated, except that the positions of the gravure roll and the back rolls in the coating apparatus were adjusted such that the thickness of the coating tangential line was 11 to 13 mm, to obtain a battery separator.

Comparative Example 21

The same procedure as in Example 12 was repeated, except that the cell capacity of the gravure roll in the coating apparatus was changed so that the porous layer having a thickness of 8 μm was formed, to obtain a battery separator.

Table 1 shows the production conditions of the polyolefin microporous membrane obtained in Examples 1 to 11 and Comparative Examples 1 to 9. Table 2 shows the production conditions of the battery separators obtained in Examples 12 to 30 and Comparative Examples 10 to 21, and the properties of the battery separators and the rolls thereof.

TABLE 1

| | Longitudial Stretching Apparatus | Surface Roughness of Longitudinal Stretching Roll (S) | Speed Ratio of Longitudinal Stretching Roll | Nipping Pressure (MPa) | Surface Temperature of Longitudinal Stretching Roll | Aerial Transport Distance (m) |
|---|---|---|---|---|---|---|
| Example 1 | (1) | 0.5 | 1.3/1.5/1.8/2.1 | 0.3 | 110 ± 2° C. | 1.5 |
| Example 2 | (2) | 0.5 | 1.3/1.5/1.8/2.1 | 0.3 | 110 ± 2° C. | 1.5 |
| Example 3 | (3) | 0.5 | 1.3/1.5/1.8/2.1 | 0.3 | 110 ± 2° C. | 1.5 |
| Example 4 | (4) | 0.5 | 1.5/2.0/2.5 | 0.3 | 110 ± 2° C. | 1.5 |
| Example 5 | (1) | 0.5 | 1.3/1.5/1.8/2.1 | 0.1 | 110 ± 2° C. | 1.5 |
| Example 6 | (1) | 0.5 | 1.3/1.5/1.8/2.1 | 0.5 | 110 ± 2° C. | 1.5 |
| Example 7 | (1) | 0.5 | 1.3/1.5/1.8/2.1 | 0.3 | 110 ± 2° C. | 1.5 |
| Example 8 | (1) | 5.0 | 1.3/1.5/1.8/2.1 | 0.3 | 110 ± 2° C. | 1.5 |
| Example 9 | (1) | 0.5 | 1.2/1.5/1.8/2.3 | 0.3 | 110 ± 2° C. | 1.5 |
| Example 10 | (1) | 0.5 | 1.3/1.7/1.8/1.9 | 0.3 | 110 ± 2° C. | 1.5 |
| Example 11 | (1) | 0.5 | 1.3/1.5/1.8/2.1 | 0.3 | 110 ± 2° C. | 1.5 |
| Comparative Example 1 | (1) | 0.5 | 1.3/1.5/1.8/2.1 | — | 110 ± 2° C. | 1.5 |
| Comparative Example 2 | (2) | 0.5 | 1.3/1.5/1.8/2.1 | — | 110 ± 2° C. | 1.5 |
| Comparative Example 3 | (1) | 0.5 | 1.3/1.5/1.8/2.1 | 0.04 | 110 ± 2° C. | 1.5 |
| Comparative Example 4 | (1) | 0.1 | 1.3/1.5/1.8/2.1 | 0.3 | 110 ± 2° C. | 1.5 |
| Comparative Example 5 | (1) | 0.5 | 1.6/1.6/1.7/1.7 | 0.3 | 110 ± 2° C. | 1.5 |
| Comparative Example 6 | (1) | 0.5 | 1.1/1.3/1.5/3.5 | 0.3 | 110 ± 2° C. | 1.5 |
| Comparative Example 7 | (1) | 0.5 | 1.3/1.7/1.8/1.9 | 0.3 | 110 ± 2° C. | 1.5 |
| Comparative Example 8 | (1) | 0.5 | 1.3/1.5/1.8/2.1 | 0.3 | 110 ± 3° C. | 1.5 |
| Comparative Example 9 | (1) | 0.5 | 1.3/1.5/1.8/2.1 | 0.3 | 110 ± 2° C. | 5 |

TABLE 2

| | PE Membrane | Thickness of PE Membrane (μm) | Variation range of F25 value (MPa) | Coating Liquid | Line Width of Coating Tangent (mm) | Deflection Accuracy of Coating Roll (μm/φ100 mm) | Thinckness of Porous Layer (μm) | Variation Range of Porous Layer Thickness in Longitudinal Direction (μm) | Winding Appearance | Defect |
|---|---|---|---|---|---|---|---|---|---|---|
| Example 12 | A | 5 | 0.7 | a | 3~5 | 8 | 2 | 0.6 | ○ | ○ |
| Example 13 | B | 5 | 0.6 | a | 3~5 | 8 | 2 | 0.5 | ○ | ○ |
| Example 14 | C | 5 | 0.8 | a | 3~5 | 8 | 2 | 0.7 | ○ | ○ |
| Example 15 | D | 5 | 0.9 | a | 3~5 | 8 | 2 | 1.0 | ○ | ○ |
| Example 16 | E | 5 | 1.0 | a | 3~5 | 8 | 2 | 0.9 | ○ | ○ |
| Example 17 | F | 5 | 0.5 | a | 3~5 | 8 | 2 | 0.4 | ○ | ○ |
| Example 18 | G | 6 | 0.8 | a | 3~5 | 8 | 2 | 1.0 | ○ | ○ |
| Example 19 | H | 5 | 0.5 | a | 3~5 | 8 | 2 | 0.5 | ○ | ○ |
| Example 20 | I | 5 | 0.6 | a | 3~5 | 8 | 2 | 0.5 | ○ | ○ |
| Example 21 | J | 5 | 0.8 | a | 3~5 | 8 | 2 | 0.7 | ○ | ○ |
| Example 22 | K | 3 | 0.8 | a | 3~5 | 8 | 2 | 1.0 | ○ | ○ |
| Example 23 | A | 5 | 0.7 | b | 3~5 | 8 | 2 | 0.6 | ○ | ○ |
| Example 24 | A | 5 | 0.7 | c | 3~5 | 8 | 2 | 0.6 | ○ | ○ |
| Example 25 | A | 5 | 0.7 | a | 3~5 | 10 | 2 | 0.8 | ○ | ○ |
| Example 26 | A | 5 | 0.7 | a | 3~5 | 5 | 2 | 0.5 | ○ | ○ |
| Example 27 | A | 5 | 0.7 | a | 5~7 | 8 | 2 | 0.6 | ○ | ○ |
| Example 28 | A | 5 | 0.7 | a | 8~10 | 8 | 2 | 0.6 | ○ | ○ |
| Example 29 | A | 5 | 0.7 | a | 3~5 | 8 | 4 | 0.8 | ○ | ○ |
| Example 30 | A | 5 | 0.7 | c | 3~5 | 8 | 2 + 2 | 0.6 | ○ | ○ |
| Comparative Example 10 | L | 5 | 2.1 | a | 3~5 | 8 | 2 | 2.4 | Δ | ○ |
| Comparative Example 11 | M | 5 | 1.9 | a | 3~5 | 8 | 2 | 2.0 | Δ | ○ |
| Comparative Example 12 | N | 5 | 1.6 | a | 3~5 | 8 | 2 | 1.8 | Δ | ○ |
| Comparative Example 13 | O | 5 | 1.3 | a | 3~5 | 8 | 2 | 1.4 | Δ | ○ |
| Comparative Example 14 | P | 5 | 1.7 | a | 3~5 | 8 | 2 | 1.8 | Δ | ○ |
| Comparative Example 15 | Q | 5 | 1.5 | a | 3~5 | 8 | 2 | 1.7 | Δ | ○ |
| Comparative Example 16 | R | 5 | 2.3 | a | 3~5 | 8 | 2 | 2.1 | X | ○ |
| Comparative Example 17 | S | 5 | 1.4 | a | 3~5 | 8 | 2 | 1.8 | Δ | ○ |
| Comparative Example 18 | T | 5 | 1.1 | a | 3~5 | 8 | 2 | 1.2 | Δ | ○ |
| Comparative Example 19 | A | 5 | 0.7 | a | 3~5 | 12 | 2 | 1.8 | Δ | ○ |
| Comparative Example 20 | A | 5 | 0.7 | a | 11~13 | 8 | 2 | 0.6 | ○ | Δ |
| Comparative Example 21 | A | 5 | 0.7 | a | 3~5 | 8 | 8 | 1.3 | ○ | ○ |

The invention claimed is:

1. A polyolefin microporous membrane having: a variation range of F25 value in a longitudinal direction of 1 MPa or less; a thickness of 3 μm or more and less than 7 μm; and a length of 1,000 m or more (wherein the F25 value is a value obtained by measuring a load value applied to a test specimen when the test specimen is stretched by 25% using a tensile tester; and dividing the load value by a value of a cross-sectional area of a test specimen).

2. A battery separator comprising:
the polyolefin microporous membrane according to claim 1; and
a porous layer formed on at least one surface of the polyolefin microporous membrane, which contains at least one resin selected from the group consisting of fluorine resins, acrylic resins, polyvinyl alcohol resins and carboxymethyl cellulose resins, and particles, and which has an average thickness $T_{(ave)}$ of 1 to 5 μm.

3. The battery separator according to claim 2, wherein the porous layer has a thickness variation range (R) in a longitudinal direction of 1.0 μm or less.

4. The battery separator according to claim 2, wherein the polyolefin microporous membrane has a length of 2,000 m or more.

5. The battery separator according to claim 2, wherein the polyolefin microporous membrane has a length of 3,000 m or more.

6. A method of producing the polyolefin microporous membrane according to claim 1, the method comprising:

(a) melt blending a polyolefin resin and a forming solvent to prepare a polyolefin resin solution;

(b) extruding the polyolefin resin solution in the form of a sheet, by an extruder, and cooling the resultant to form an unstretched gel-like sheet;

(c) allowing the unstretched gel-like sheet to pass through at least three sets of longitudinal stretching rolls to be stretched in the longitudinal direction based on the peripheral speeds of the stretching rolls, which peripheral speeds are set at progressively higher rates in a direction in which the sheet passes, to obtain a longitudinally stretched gel-like sheet, wherein one longitudinal stretching roll, and one or more nip rolls coated with a heat resistant rubber and in contact with the longitudinal stretching roll in parallel, are defined as one set of longitudinal stretching rolls, wherein the nip roll(s) come(s) into contact with the longitudinal stretching roll at a pressure of 0.05 MPa or more and 0.5 MPa or less;
- (d) stretching the longitudinally stretched gel-like sheet in a transverse direction, with the sheet held such that a clip-to-clip distance at a tenter exit is 50 mm or less, to obtain a biaxially stretched gel-like sheet;
- (e) extracting the forming solvent from the biaxially stretched gel-like sheet, followed by drying; and
- (f) subjecting the dried sheet to a heat treatment, to obtain the polyolefin microporous membrane.

7. The method according to claim 6, wherein in step (c), the peripheral speed ratios between respective adjacent longitudinal stretching rolls are set at progressively higher rates in the direction in which the sheet passes.

8. A method of producing a roll of a polyolefin microporous membrane, the method comprising winding the polyolefin microporous membrane obtained by the method according to claim 6, at a transport rate of 50 m/min or more.

9. A method of producing a battery separator, the method comprising coating a coating liquid containing at least one resin selected from the group consisting of fluorine resins, acrylic resins, polyvinyl alcohol resins and cellulose ether resins, and particles, on at least one surface of the polyolefin microporous membrane obtained by the method according to claim 6, by a roll coating method using a coating roll having a deflection accuracy of equal to or less than 10 µm/Φ100 mm, followed by drying.

10. The method of producing a battery separator according to claim 9, wherein the coating roll is a gravure roll.

11. The battery separator according to claim 3, wherein the polyolefin microporous membrane has a length of 2,000 m or more.

12. The battery separator according to claim 3, wherein the polyolefin microporous membrane has a length of 3,000 m or more.

13. The battery separator according to claim 4, wherein the polyolefin microporous membrane has a length of 3,000 m or more.

14. A method of producing a roll of a polyolefin microporous membrane, the method comprising winding the polyolefin microporous membrane obtained by the method according to claim 7, at a transport rate of 50 m/min or more.

15. A method of producing a battery separator, the method comprising coating a coating liquid containing at least one resin selected from the group consisting of fluorine resins, acrylic resins, polyvinyl alcohol resins and cellulose ether resins, and particles, on at least one surface of the polyolefin microporous membrane obtained by the method according to claim 7, by a roll coating method using a coating roll having a deflection accuracy of equal to or less than 10 µm/Φ100 mm, followed by drying.

* * * * *